Figure 1:
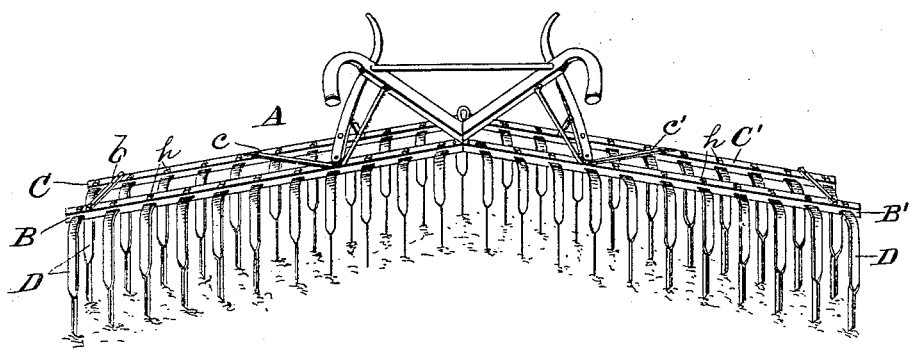

No. 632,961. Patented Sept. 12, 1899.
G. B. DAVISON.
WEEDER.
(Application filed Feb. 1, 1899.)

(No Model.) 2 Sheets—Sheet 1.

Witnesses
Jas. Blackwood
H. P. Doolittle

Inventor
George B. Davison,
by M. P. Doolittle & Son,
Attorneys.

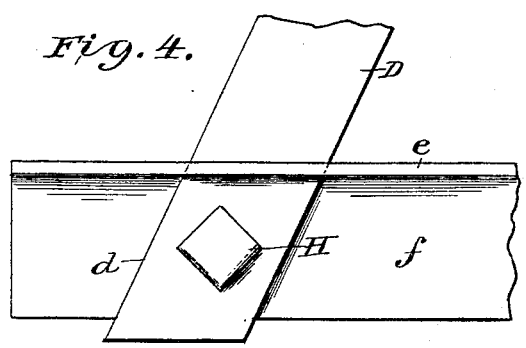
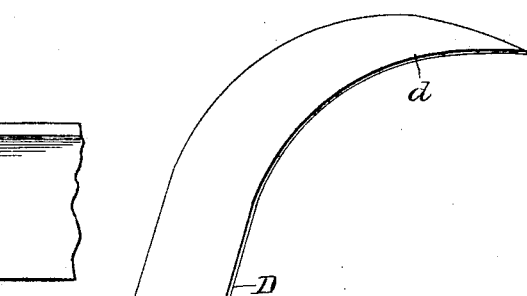
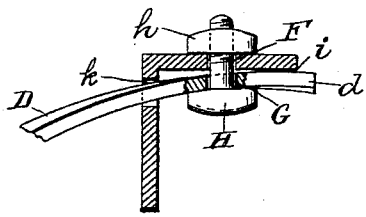
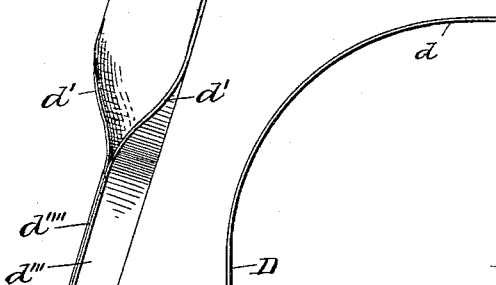
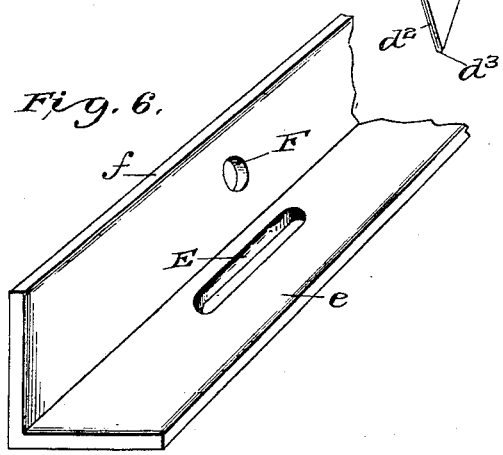
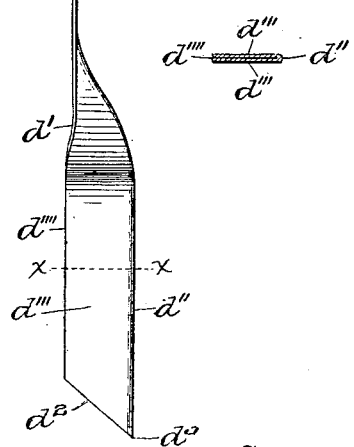

UNITED STATES PATENT OFFICE.

GEORGE BENNETT DAVISON, OF UTICA, NEW YORK.

WEEDER.

SPECIFICATION forming part of Letters Patent No. 632,961, dated September 12, 1899.

Application filed February 1, 1899. Serial No. 704,109. (No model.)

*To all whom it may concern:*

Be it known that I, GEORGE BENNETT DAVISON, a citizen of the United States, residing at Utica, in the county of Oneida and State of New York, have invented certain new and useful Improvements in Weeders, of which the following is a specification.

My invention relates to weeders, and has for its objects to provide a weeder of a form that will give strength and ease of travel to the frame, will tend to prevent clogging thereof, and will permit of the most effective arrangement of the teeth for weeding; to provide an exceedingly strong tooth for the weeder, one that will pass through the soil easily, will effectually loosen and uproot the weeds without injuring the plants or their roots, and will not catch in the plants nor become clogged with the weeds; and to provide for such teeth fastening means of simple and strong character that will hold the teeth securely on the frame, while preserving their flexibility, and that will not jar loose from the frame, but will at the same time permit of the ready removal of the teeth.

For the purposes above set forth the frame of the weeder is constructed as hereinafter described. The weeder-tooth fastening is constructed to coöperate with the weeder-tooth.

The object in view with weeder-teeth is not to plow or dig the ground like a cultivator-tooth, but rather to trail upon the ground without penetrating to any great depth vertically or laterally, so as to disturb the roots of the plants and to catch and loosen the weeds and to present as little holding-surface as possible to the same, so that they will not clog the machine, but will be thrown aside or slip by. To these ends the tooth is usually made long and slender and preferably of some spring material—as, for instance, spring-steel. In most of such teeth, however, in striving to attain the above objects the teeth are made too weak and present too great an engaging surface to the soil to enable it to pass through the same with the ease desired. I am aware that heretofore teeth for weeders and harrows have been made round and V-shaped in cross-section at their soil-engaging portions; but these forms of teeth lack several advantages possessed by the tooth constituting my present invention, as will be hereinafter more fully set forth. Teeth having the lower weeding part made tubular in form are liable to buckle or bend under strain, and they present more surface to the soil than is desirable. The tooth itself of the form I have devised is not claimed herein, but is made the subject of application Serial No. 723,433, and is here illustrated and described to show the peculiar and convenient adaptation of my form of fastener to that particular tooth.

While accomplishing the objects above set forth, it is also desirable that the tooth be held in the frame of the machine in such a manner that while the flexibility of the tooth is preserved its entire spring tension will be exerted without tending to loosen the tooth from its frame. It is a great annoyance found in the use of some weeder-teeth that by reason of their great flexibility and the constant jarring to which they are subjected they are continually becoming loose and falling from the frame. On the other hand, a too rigid, heavy, and stiff connection with the frame detracts from the flexibility and renders the tooth too unyielding and liable to break. It is therefore quite necessary that suitable holding means should combine and coöperate with a suitably-formed tooth to accomplish the best and most desirable results.

My invention is illustrated in the accompanying drawings, in which—

Figure 2:
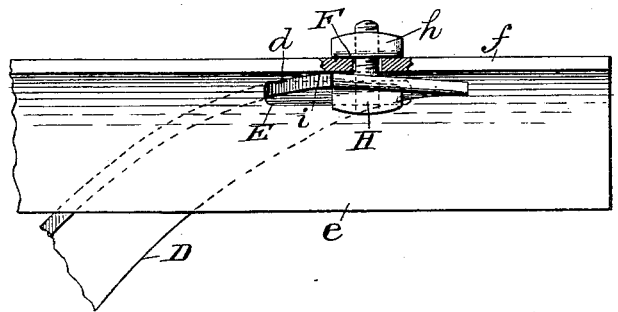
Figure 3:
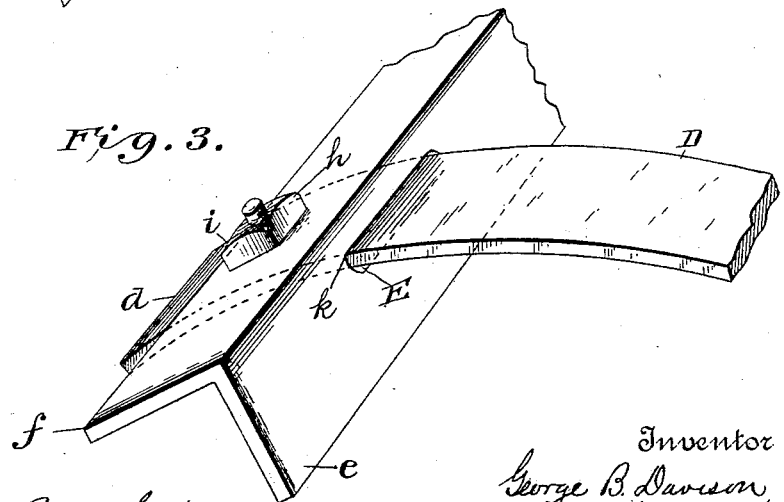

Figure 1 is a rear perspective view of a weeder-machine with my improvements attached; Fig. 2, a front view in elevation of portion of angle-bar of frame, showing tooth-fastening and part of a tooth; Fig. 3, a perspective view of same parts from the rear; Fig. 4, a bottom plan view of same parts; Fig. 5, a sectional view of same parts along edge of tooth, showing bearing-points; Fig. 6, a perspective view of under side of portion of angle-bar; Fig. 7, a perspective view of weeder-tooth; Fig. 8, a side view in elevation of tooth, and Fig. 9 a section of same.

Referring to the drawings, A is the frame of the weeder, which is substantially V-shaped and is formed of the rear angle-bars B B', suitably clamped at the apex of the V-frame, and the front bars C C', respectively, parallel to bars B B'. At the center of the frame the front and rear bars are joined by the supporting-brace of the weeder-handles, and bars B and C and B' and C' are respectively connected by braces $b\ c$ and $b'\ c'$. Secured to the front bars at suitable intervals apart are the weeder-teeth D, and to the rear bars, opposite the spaces between the teeth of the front bars, are similar teeth. The parallel bars permit this alternate arrangement of the teeth, while the diagonal angle of the bars to the line of draft permits the weeder to be drawn through the soil more easily and any weeds that may have caught in the teeth to more easily slide off therefrom at the ends of the weeder.

The flexibility and spring-yielding action of the tooth D is obtained in my invention by making the upper part $d$ of the tooth flat and curved like the upper part of the ordinary spring-harrow tooth. A short distance below its center the edges of the tooth are bent back to form wings $d'$, which are then bent backward from the middle of the tooth and pressed or stamped flatly upon each other, so as to form a slightly-rounded front edge $d''$, flat straight sides $d'''$, and a sharp rear edge $d''''$. The part of the tooth thus formed extends to the lower end and is adapted to engage the soil. The bottom edge $d^2$ of the tooth is inclined from the front to the rear, as shown, and at its angle with the front edge forms a central soil engaging and cutting point $d^3$.

The upper part of the tooth may be modified slightly without departing from the principle of my invention; but the flat-spring form of the upper part is preferable for the purposes of flexibility, cheapness, ease of manufacture in connection with the lower part of the tooth, and convenience of attachment to the weeder-frame.

It will be seen that the tooth above described will, while possessing the desired flexibility, yet have in the soil-engaging part of the tooth the desired strength and sufficient rigidity and stiffness to pass easily through the soil and readily loosen the weeds therefrom. The slightly-rounded front edge of the tooth prevents injury to the plants, yet presents no obstruction to the free passage of the flat sides. While the soil-engaging portion has the desirable stiffness above set forth, it also possesses a sidewise flexibility, due to its flat sides and upper spring portion, that enables it to yield laterally on contact with plants, trees, or other objects, which is an advantage not possessed by the teeth of tubular and other forms heretofore referred to.

The fastening means for the tooth consist of a horizontal slot E near the upper edge of the vertical face $e$ of an angle-bar of the frame and a bolt and nut to hold the tooth in the slot. The slot is slightly longer than the width of the tooth D. Cut in the horizontal face $f$ of the angle-bar opposite to and having its circumference on a line with the end of the slot E is a bolt-hole F. In the curved spring-tooth D, near its upper end, is cut a corresponding bolt-hole G. The end of the tooth is passed through the slot in a straight direction with the line of draft from rear to front, which will bring it diagonally to the angle-bar and bolt-hole G under hole F, as shown. A headed screw-bolt H is then passed through the bolt-hole and a nut $h$ screwed on the end thereof to secure the tooth and bar together. It will be seen that owing to the curvature of the tooth and the angle at which it is placed to the frame the tooth will bite more strongly against the bar at the diagonally-opposite points $i\ k$ of the edge of the angle-bar and upper edge of the slot, respectively, so that spring tension will be exerted by the unevenly-supported tooth against the nut and head of the bolt, and thus lock the nut in place. When the nut is screwed up tightly, the tooth will be pressed flat on the bar; but the tension due to the diagonally-biting edges will still be sufficient to keep the nut from jarring loose. The tooth does not bear flatly against the upper wall of the slot, but merely against the forward edge thereof, and owing to the relative positions of the bolt-holes and slot and the curvature of the tooth a space will be left between the under surface of the tooth and the lower wall of the slot E. The tooth by these means is permitted to yield backward and forward and its flexibility thus preserved.

Owing to the flexibility and light weight of the weeder-tooth the fastener above set forth, notwithstanding its few parts and light structure, will be found fully adequate for securing such tooth firmly to the frame, and great simplicity in construction and cheapness in the cost of manufacture are thus obtained.

Having thus described my invention, what I claim is—

1. In a weeder, a frame composed of angle-bars set diagonally to the line of draft, a slot in one face of each of said angle-bars, a bolt-hole in the other face near the inner end of the slot, a weeder-tooth having a flat upper end in said slot, and having a bolt-hole and a bolt to secure said tooth and bar together, substantially as described.

2. In a weeder, in combination with a spring weeder-tooth having a flat, curved upper portion, an angle-bar having a slot through which said tooth passes, bolt-holes in said bar and tooth and a screw-bolt in said holes, substantially as described.

3. In a weeder, the combination with fastening means consisting of a slotted angle-iron, screw bolt and nut, the bolt-hole in the iron toward one end of the slot, of a spring weeder-tooth having a flat curved shank, whereby the tooth is gripped by said angle-iron at diagonally opposite points on the edges of said tooth and a spring tension thereby exerted against said nut, substantially as described.

4. In a weeder, the combination with fastening means consisting of a slotted angle-iron having a slot in the vertical face thereof, screw bolt and nut, the bolt-hole in the iron toward one end of the slot, of a spring weeder-tooth having a long, flexible body and a flat, curved shank, a space between said shank and the wall of the slot, said tooth adapted to bear more strongly on the bar at diagonally opposite points on its edges, whereby a yielding action of the tooth is permitted and its flexibility preserved, substantially as described.

5. A tooth-fastener consisting of an angle-iron having a slot in one face of the same, a bolt-hole and bolt in the other face of the angle-iron toward the end of said slot, in combination with a tooth having a flat curved shank provided with a bolt-hole for said bolt, substantially as described.

In testimony whereof I have hereunto affixed my signature in the presence of two witnesses.

GEORGE BENNETT DAVISON.

Witnesses:
W. I. SCOTT,
M. A. QUIGLEY.